US009173385B2

(12) United States Patent
Cooper et al.

(10) Patent No.: US 9,173,385 B2
(45) Date of Patent: Nov. 3, 2015

(54) RATTLING JIG

(71) Applicants: Dennis Cooper, Mooresville, IN (US);
Michael Looney, Indianapolis, IN (US)

(72) Inventors: Dennis Cooper, Mooresville, IN (US);
Michael Looney, Indianapolis, IN (US)

( * ) Notice: Subject to any disclaimer, the term of this patent is extended or adjusted under 35 U.S.C. 154(b) by 150 days.

(21) Appl. No.: 13/966,747

(22) Filed: Aug. 14, 2013

(65) Prior Publication Data

US 2015/0047247 A1    Feb. 19, 2015

(51) Int. Cl.
*A01K 85/00* (2006.01)
*A01K 85/01* (2006.01)
*A01K 85/02* (2006.01)

(52) U.S. Cl.
CPC ............ *A01K 85/01* (2013.01); *A01K 85/02* (2013.01)

(58) Field of Classification Search
CPC ....... A01K 85/01; A01K 85/02; A01K 85/00; A01K 85/08; A01K 85/18
USPC ............. 43/42.31, 42.36–42.38, 42.45, 42.49
See application file for complete search history.

(56) References Cited

U.S. PATENT DOCUMENTS

| 2,163,666 | A |   | 6/1939 | Carter et al. |           |
|-----------|---|---|--------|---------------|-----------|
| 2,581,485 | A | * | 1/1952 | Herkenham     | 43/42.36  |
| 3,909,974 | A | * | 10/1975| Kent          | 43/42.31  |
| 4,015,363 | A | * | 4/1977 | Sedlak        | 43/42.22  |
| 4,414,772 | A | * | 11/1983| Duncan        | 43/42.36  |
| 4,791,750 | A |   | 12/1988| Gammill       |           |
| 5,001,856 | A |   | 3/1991 | Gentry        |           |
| 5,121,568 | A | * | 6/1992 | Lindmeyer     | 43/42.31  |
| 5,134,799 | A | * | 8/1992 | Trnka         | 43/42.22  |
| 5,253,446 | A |   | 10/1993| Ogle          |           |
| 5,829,183 | A | * | 11/1998| Guerin        | 43/42.35  |
| 6,155,000 | A | * | 12/2000| Ravencroft    | 43/42.31  |
| 2011/0247261 | A1 |   | 10/2011 | Mason         |           |

* cited by examiner

*Primary Examiner* — Darren W Ark
*Assistant Examiner* — Danielle Clerkley
(74) *Attorney, Agent, or Firm* — Maginot, Moore & Beck, LLP

(57) ABSTRACT

A fishing lure is provided which includes a jig, a hook integrally formed within the jig, and a number of pellets retained within the jig. The jig includes a male portion and a female portion, each of which has a blind cavity formed therein. The male portion and the female portion are press-fitted together such that the blind cavities form a single, internal cavity within the jig which is configured to retain the number of pellets. The male portion of the jig also includes a groove configured to accept the hook therein. The groove is configured such that the hook is retained within the jig when the male portion and the female portion are press-fitted together. The groove includes a bend portion configured to retain the hook in tension. The groove also includes an exposed portion that is in fluid communication with the internal cavity.

14 Claims, 5 Drawing Sheets

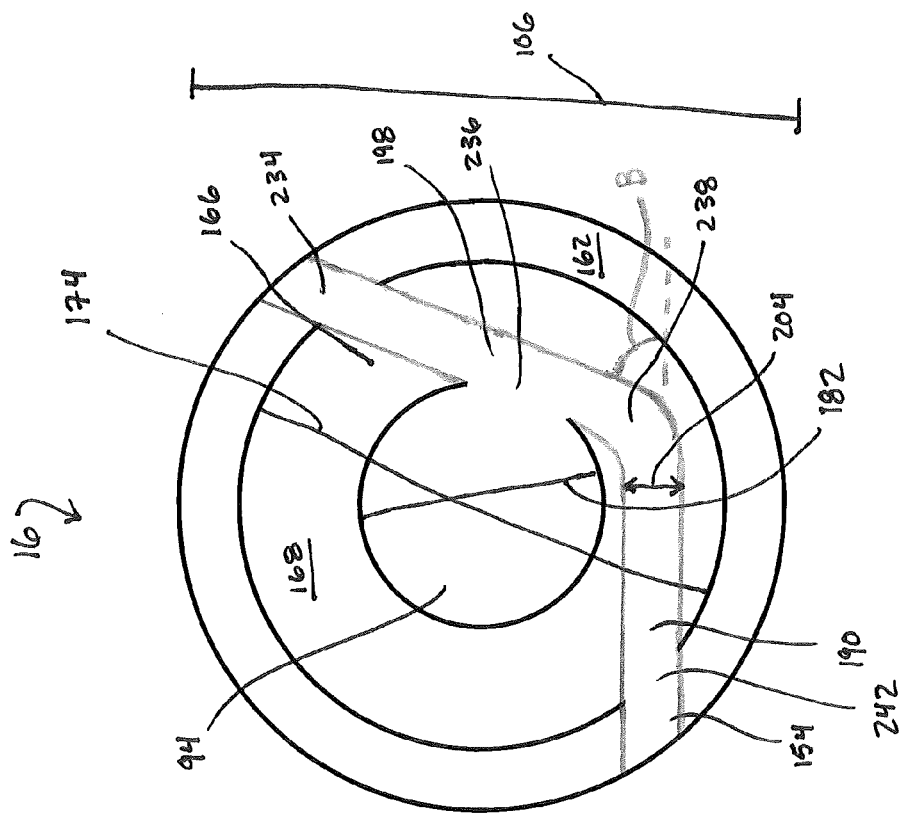
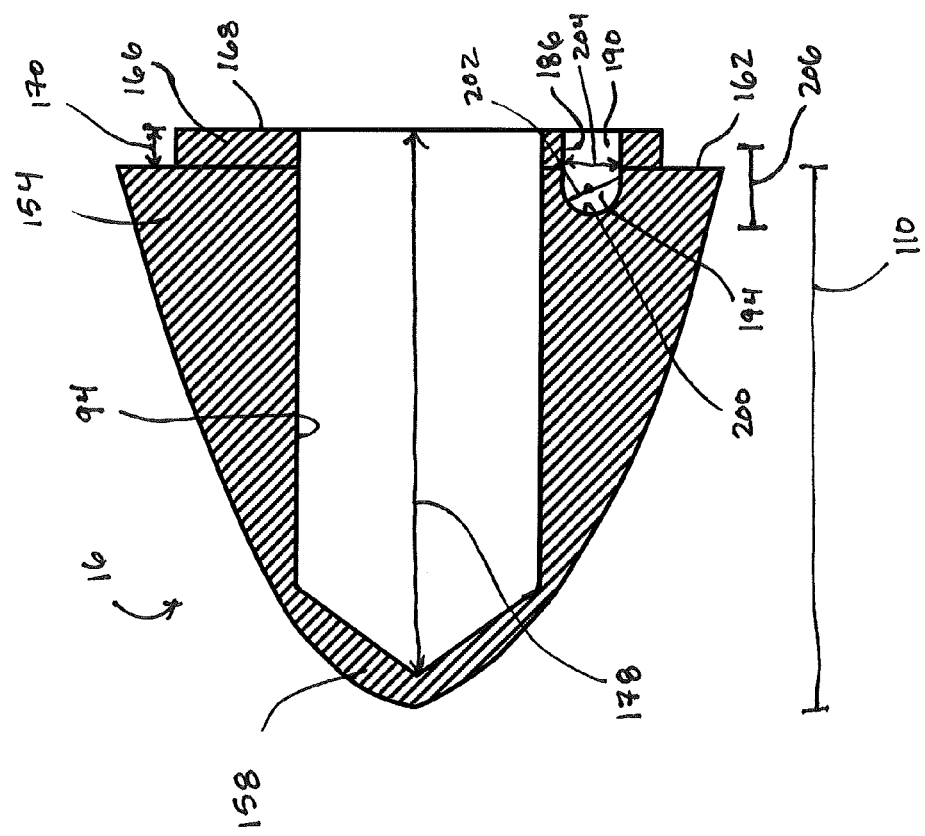
FIG. 5B
FIG. 5A

RATTLING JIG

BACKGROUND

Fishermen use a variety of hooks, baits, lures, casting styles and rods to angle for specific varieties of fish based on what is believed to be most successful at attracting each type of fish. Accordingly, a wide array of equipment and techniques has been developed to aid in angling and catching fish. In general, a lure is a device coupled to the fishing hook, away from the point of the hook, to entice the fish to bite the hook and become ensnared on the point of the hook. Lures have a variety of shapes and sizes, colors and attached accessories believed to be attractive to a specific type of fish. One type of lure is a jig, which is generally a rounded body having a hook molded therein and often including a tail constructed of feathers or hair. The combination of the rounded body of the jig and the attached tail are meant to mimic a large bug or a smaller fish or some other sort of prey to attract the fish. When the fish bites on the lure, he also bites the hook, and then is caught.

Another feature often incorporated into fishing lures is a rattle which produces vibrations to attract the attention of fish. The rattle is meant to imitate the vibrations produced by certain prey and has enough amplitude to attract the attention of nearby fish. Some rattles are provided as an external attachment coupled to the jig, but this can make the amplitude of the rattle vibrations too large to correctly mimic the vibrations of prey. Additionally, external rattles are another piece of equipment that the fisherman must purchase and attach to his hook, adding expense and inconvenience. Accordingly, it is desirable to provide a rattle for use with a jig that produces vibrations having an amplitude that can mimic the vibrations of prey, that is inexpensive and convenient for a fisherman to use, that is easy to produce and to integrate into smaller lures and that can be tailored to mimic different types of prey and to accommodate different fishing conditions.

SUMMARY

A fishing lure is provided which includes a jig, a hook integrally formed within the jig, and a number of pellets retained within the jig. The jig includes a male portion and a female portion, each of which has a blind cavity formed therein. The male portion and the female portion are press-fitted together such that the blind cavities form a single, internal cavity within the jig which is configured to retain the number of pellets. The male portion of the jig also includes a groove configured to accept the hook therein. The groove is configured such that the hook is retained within the jig when the male portion and the female portion are press-fitted together. The groove includes a bend portion configured to retain the hook in tension. The groove also includes an exposed portion that is in fluid communication with the internal cavity.

BRIEF DESCRIPTION OF THE DRAWINGS

FIG. 5A is a cross-sectional view of a male portion of the jig body.

FIG. 5B is a plan view of a male portion of the jig body.

DETAILED DESCRIPTION

Figure 1:
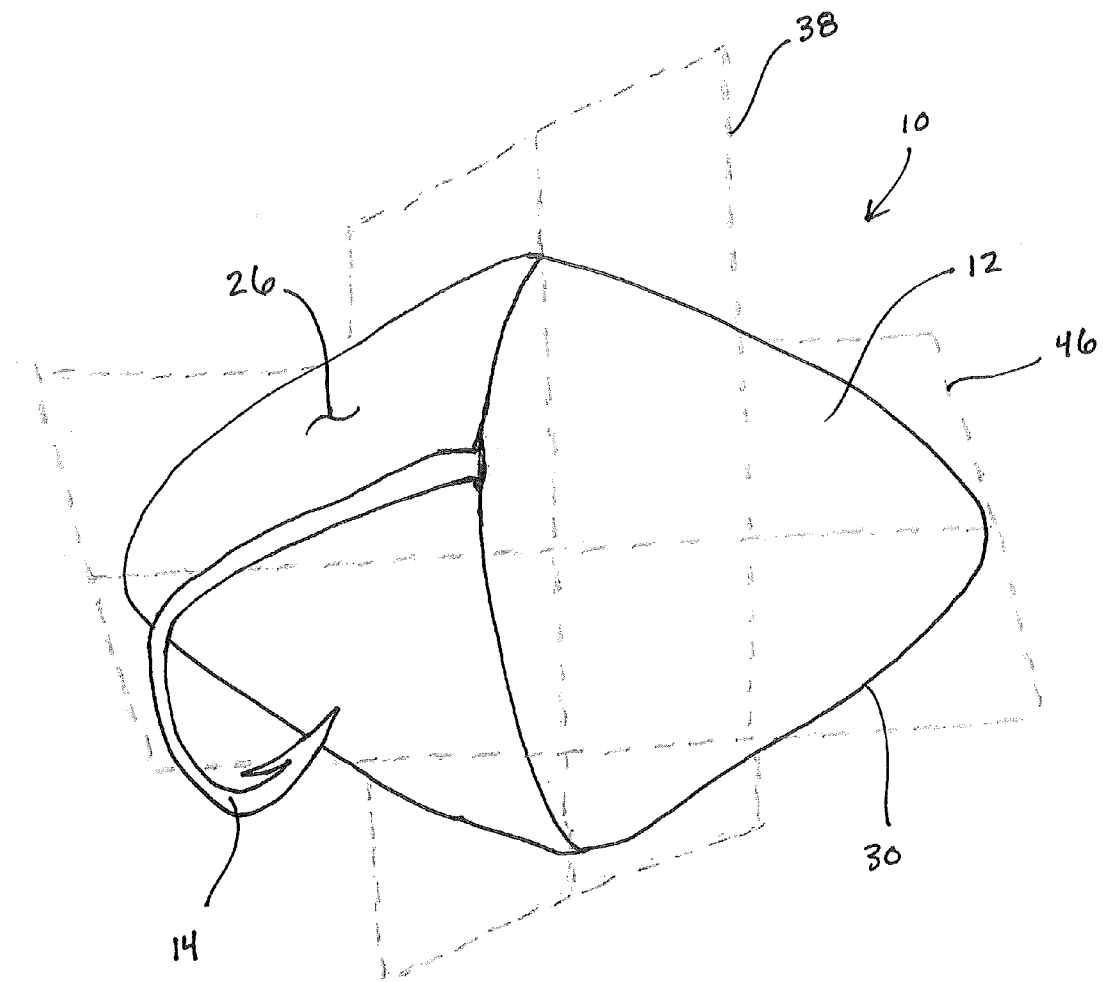
FIG. 1 is a perspective view of a rattling jig.
Figure 2:
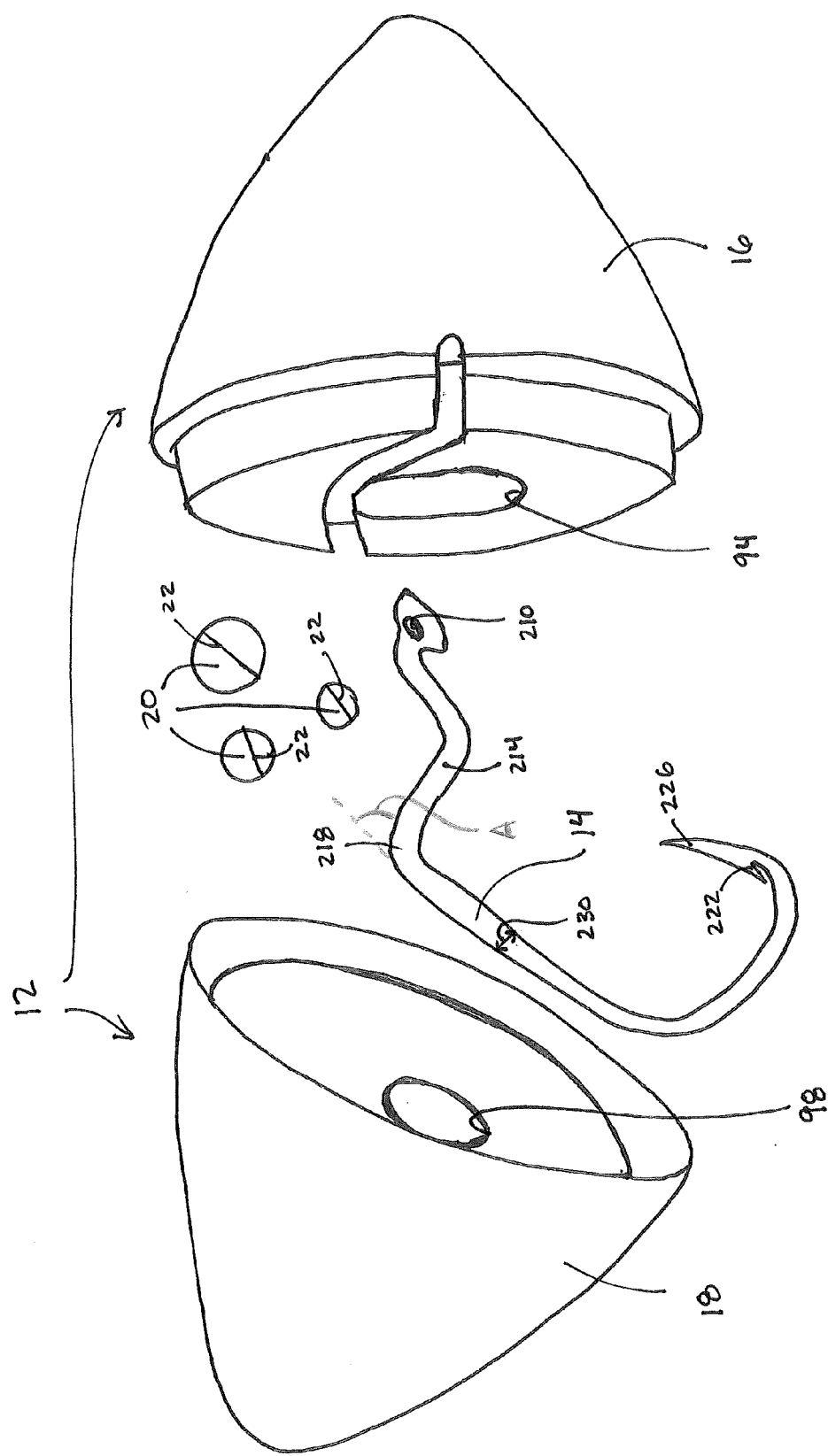
FIG. 2 is an exploded view of the rattling jig of FIG. 1 including a jig body, pellets, and a hook.

As shown in FIG. 1, the rattling jig 10 includes a jig body 12 and a hook 14 fixedly inserted through the jig body 12. As shown in FIG. 2, the jig body 12 includes a male portion 16 and a female portion 18, and the rattling jig 10 also includes a one or more of pellets 20 contained within the male portion 16 and the female portion 18 of the jig body 12. In use, the pellets 20 rattle within the jig body 12 and contact the hook 14 within the jig body 12. The resulting vibrations propagate through the jig body 12 as well as the hook 14 to attract fish to the rattling jig 10. When a fish contacts any portion of the rattling jig 10, the force of the contact translates through the hook 14 and the attached line back to the fisherman.

Figure 3B:
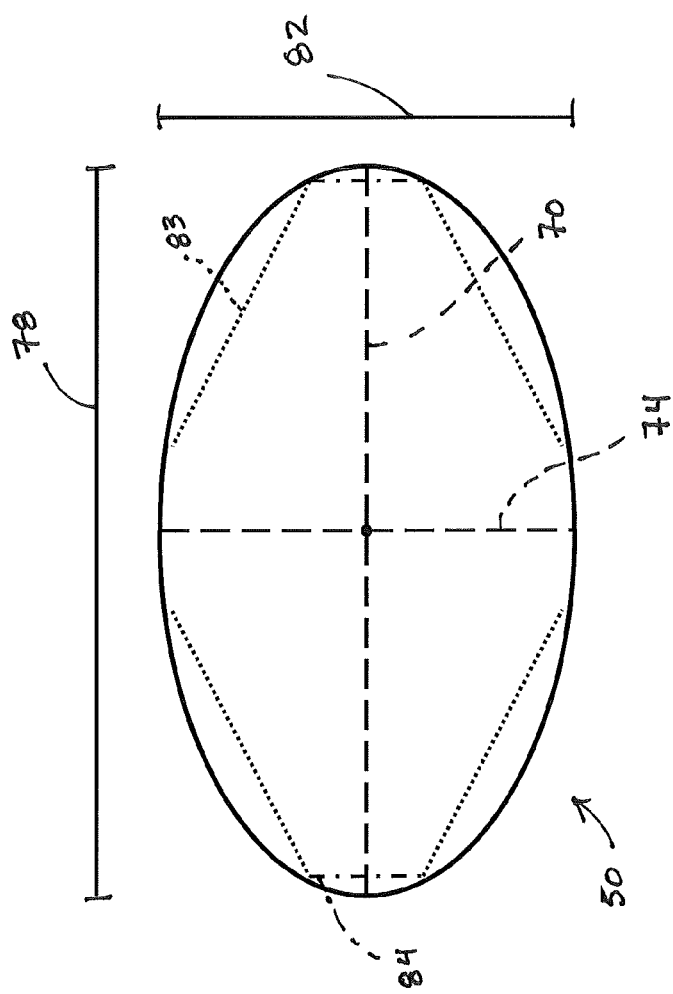
FIG. 3B is a cross-sectional view of the jig body taken along a transverse plane.
Figure 3A:
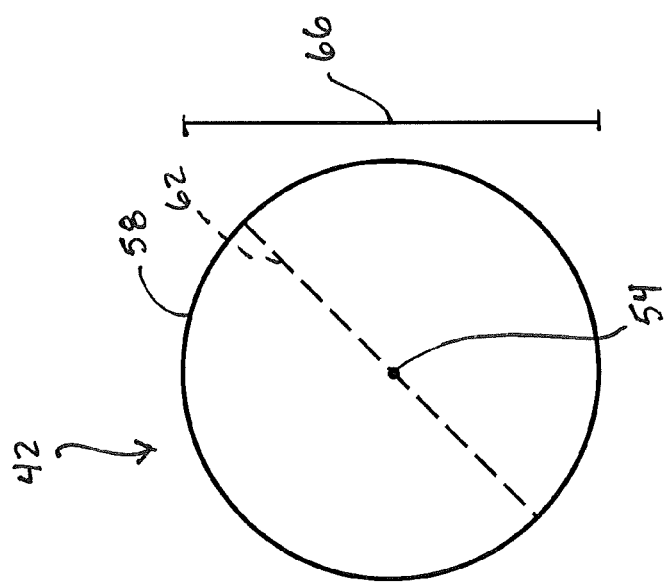
FIG. 3A is a cross-sectional view of the jig body of the rattling jig of FIG. 1 taken along a medial plane.

Returning to FIG. 1, the jig body 12 is essentially comprised of a hard material 26 which is able to be machined such as, for example, steel or another metal. The jig body 12 has an outermost surface 30 which is able to be smoothed by, for example, sand blasting. In at least one embodiment, the smoothed outermost surface 30 of the jig body 12 is additionally coated with a body coating material such as, for example, water-proof paint. The jig body 12 is substantially hollow and is substantially shaped as a three-dimensional ellipsoid. The ellipsoid is bilaterally and radially symmetrical such that when the jig body 12 is projected onto a medial plane 38, as shown in FIG. 3A, the ellipsoid has a substantially circular cross-section 42, and when the jig body 12 is projected onto a transverse plane 46, as shown in FIG. 3B, the ellipsoid has a substantially elliptical cross-section 50. It is understood that other three-dimensional shapes are possible for the jig body 12 other than the elliptical shape of the present embodiment. Certain shapes may be preferable for certain fishing environments or for certain species of fish.

Turning now to FIG. 3A, the substantially circular cross-section 42 of the ellipsoid has a center 54, a circumference 58, and a diameter 62 extending through the center 54 to opposite points on the circumference 58. A length 66 of the diameter 62 can vary between different embodiments of jig bodies 12 based on the type of fish being sought and/or the type of hook being used. In one embodiment, by way of example, the length 66 of the diameter 62 is approximately 0.500 inches.

Turning now to FIG. 3B, the substantially elliptical cross-section 50 of the ellipsoid has a major axis 70 extending through points on the ellipse that are farthest from one another and a minor axis 74 extending through points on the ellipse that are nearest to one another. In the same manner as the diameter 62 (shown in FIG. 3A) discussed above, a length 78 of the major axis 70 can vary between different embodiments of jig bodies 12 based on the type of fish being sought and/or the type of hook being used. In one embodiment, by way of example, the length 78 of the major axis 70 is approximately 0.875 inches. The ellipsoid is shaped such that the minor axis 74 is coextensive with the diameter 62 (shown in FIG. 3A). Accordingly, a length 82 of the minor axis 74 is equivalent to the length 66 of the diameter 62 (shown in FIG. 3A).

In one embodiment, the ellipse of the elliptical cross-section 50 is truncated, as shown in FIG. 3B with a dotted line 83, to form a different elongated shape having substantially the same major axis 70 and minor axis 74 as the ellipse. In another embodiment, the ellipse is truncated, as shown in FIG. 3B with a dotted/dashed line 84, to form an ellipse having flattened ends instead of rounded ends at the ends of the major axis 70. In this embodiment as well, the truncated shape has substantially the same major axis 70 and minor axis 74 as the ellipse. Accordingly, it will be understood that the precise shape of the ellipse, and thus of the ellipsoid, can vary somewhat between embodiments.

Returning to FIG. 2, as mentioned above, the male portion 16 and the female portion 18 make up the jig body 12. The male portion 16 and the female portion 18 are joined together at the medial plane 38 (shown in FIG. 1) by press-fitting the male portion 16 within the female portion 18. In other embodiments, the male portion 16 and the female portion 18 can be joined together in another non-reversible manner. The male portion 16 and the female portion 18 are substantially similar to one another, and each includes a blind cavity 94, 98, respectively, such that, when the male portion 16 and female portion 18 are joined together, the blind cavities 94, 98 combine to form a single internal cavity. As described in more detail below, the single internal cavity is configured to retain the plurality of pellets 20 such that the pellets 20 can rattle within the jig body 12.

In the present embodiment, the male portion 16 forms approximately one half of the ellipsoid and the female portion 18 forms approximately one half of the ellipsoid of the jig body 12. In other embodiments, however, the male portion 16 can form more than approximately one half and the female portion 18 can form less than approximately one half of the ellipsoid, or vice versa. The male portion 16 has a male diameter 106 (shown in FIG. 5B) and a male length 110 (shown in FIG. 5A), and the female portion 18 has a female diameter 114 (shown in FIG. 4B) and a female length 118 (shown in FIG. 4A). In the present embodiment, the male and female diameters 106, 114 are equivalent to the diameter 62 of the circular cross-section 42 (shown in FIG. 3A), and the male and female lengths 110, 118 are each equivalent to approximately one half of the length 78 of the major axis 70 of the elliptical cross-section 50 (shown in FIG. 3B) of the ellipsoid.

Figure 4B:
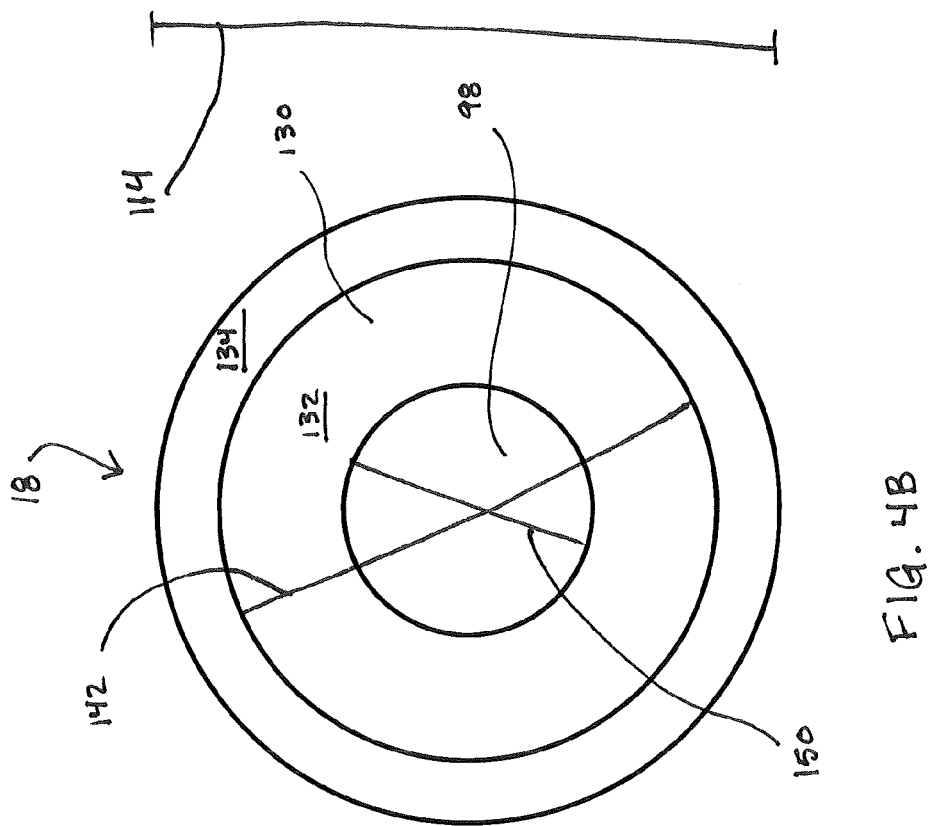
FIG. 4B is a plan view of a female portion of the jig body.
Figure 4A:
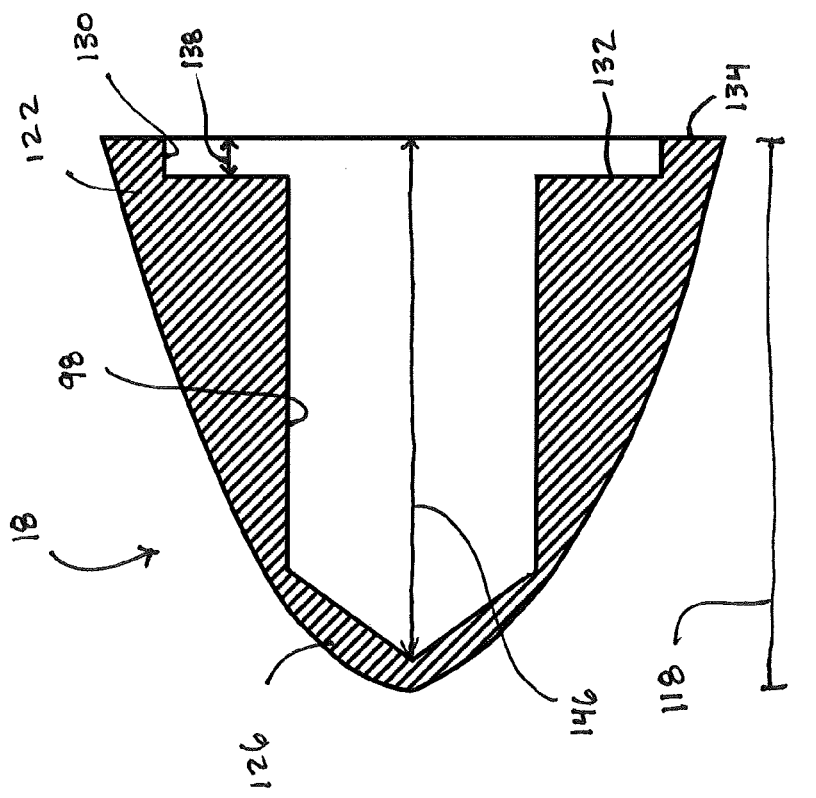
FIG. 4A is a cross-sectional view of a female portion of the jig body.

The female portion 18 of the jig body 12 is shown in cross-section in FIG. 4A and in a plan view in FIG. 4B. The female portion 18 includes a medial portion 122, a lateral portion 126, blind cavity 98, and a shoulder 130. The female portion 18 also includes a medial surface 134 at the medial portion 122 facing in a direction away from the lateral portion 126. The shoulder 130 has a planar surface 132, a shoulder depth 138 (shown in FIG. 4A), and a shoulder diameter 142 (shown in FIG. 4B). The planar surface 132 of the shoulder 130 is parallel with the medial surface 134 of the female portion 18 and is formed within the medial portion 122 of the female portion 18. The shoulder depth 138 is measured from the medial surface 134 to the planar surface 132 of the shoulder 130, and the shoulder depth 138 is less than the female length 118. In one embodiment the shoulder depth 138 is, for example, approximately 0.100 inches. The shoulder diameter 142 is measured across the planar surface 132 of the shoulder 130, and the shoulder diameter 142 is smaller than the female diameter 114.

The blind cavity 98 has a cavity depth 146 (shown in FIG. 4A) which is measured from the medial surface 134 inwardly into the female portion 18. The cavity depth 146 is larger than the shoulder depth 138 and smaller than the female length 118. The blind cavity 98 also has a cavity diameter 150 (shown in FIG. 4B) which is measured across the planar surface 132 of the shoulder 130 and which is smaller than both the female diameter 114 and the shoulder diameter 142. Both the blind cavity 98 and the shoulder 130 are open to the medial surface 134 and extend into the medial portion 122 toward the lateral portion 126 of the female portion 18. The shoulder 130 and the blind cavity 98 are formed concentrically in the female portion 18 such that both are centered relative to the female portion 18. The shoulder 130 is a wider, shallower recess and the blind cavity 98 is a narrower, deeper recess extending centrally through the shoulder 130. Because the cavity depth 146 is smaller than the female length 118, the blind cavity 98 does not extend all the way through the female portion 18.

The male portion 16 of the jig body 12 is shown in cross-section in FIG. 5A and in a plan view in FIG. 5B. The male portion 16 is substantially similar to the female portion 18, because the male portion 16 also includes a medial portion 154, a lateral portion 158, the blind cavity 94, and a medial surface 162 at the medial portion 154. The male portion 16 differs from the female portion 18, however, because the male portion 16 includes a lip 166 instead of a shoulder 130. As shown in FIG. 5A, the lip 166 has a planar surface 168, a lip height 170 and a lip diameter 174. The planar surface 168 of the lip 166 is parallel with the medial surface 162 of the male portion 16. The lip height 170 is measured from the medial surface 162 to the planar surface 168 of the lip 166. In one embodiment, the lip height 170 is, for example, approximately 0.100 inches. The blind cavity 94 has a cavity depth 178 which is larger than the lip height 170 and has a cavity diameter 182 which is smaller than the lip diameter 174. The blind cavity 94 is formed within the planar surface 168 of the lip 166 and extends through the lip 166 into the medial portion 154 of the male portion 16. The lip 166 and the blind cavity 94 are formed concentrically in the male portion 16 such that the blind cavity 94 extends centrally through the lip 166 and toward the lateral portion 158 of the male portion 16.

As mentioned above, the male portion 16 and the female portion 18 are configured to join together to form the jig body 12 including the single internal cavity. When joined together as shown in FIG. 1, the medial portion 122 of the female portion 18 and the medial portion 154 of the male portion 16 are brought into contact with one another such that the medial surface 134 of the female portion 18 and the medial surface 162 of the male portion 16 are in contact with one another and such that the planar surface 132 of the shoulder 130 and the planar surface 168 of the lip 166 are in contact with one another. To fit together in this way to form the jig body 12 shown in FIG. 1, the male portion 16 and the female portion 18 are sized in relation to one another.

More specifically, the lip height 170 and the lip diameter 174 are substantially the same size as, but slightly smaller than, the shoulder depth 138 and the shoulder diameter 142, respectively. Thus, when the male portion 16 and the female portion 18 are press-fitted together, the lip 166 is received tightly and completely within the shoulder 130 to non-removably retain the male portion 16 within the female portion 18. Additionally, the female diameter 114 is equivalent to the male diameter 106 such that when the male portion 16 and the female portion 18 are joined together, the outermost surface 30 of the jig body 12 is smooth and continuous. Additionally, the cavity diameter 150 of the female portion 18 is equivalent to the cavity diameter 182 of the male portion 16 such that when the male portion 16 and the female portion 18 are joined together, the blind cavity 98 in the female portion 18 aligns with the blind cavity 94 in the male portion 16 to form the single internal cavity as a smooth, continuous cavity to retain the pellets 20 and allow them to tumble freely within the jig body 12.

In the present embodiments, three pellets 20 (shown in FIG. 2) are contained within the single internal cavity in the jig body 12. The pellets 20 are shaped and sized to enable free rolling and movement within the single internal cavity. In the present embodiment, the pellets 20 are substantially spherically shaped and have a diameter 22 (shown in FIG. 2) equivalent to approximately 40% of the cavity diameter 150 (shown in FIG. 4B) and the cavity diameter 182 (shown in FIG. 5B) to enable the pellets 20 to move past one another within the single internal chamber. In alternative embodiments, more or fewer than three pellets 20 can be contained within the jig body 12, the pellets 20 can have other rounded shapes besides spheres, each of the pellets 20 contained within the jig body 12 can have a different diameter 22, and the pellets 20 can be sized in different proportions relative to the cavity diameters 150, 182. In all embodiments, however, the one or more pellets 20 are shaped and sized to roll and move freely within the single internal chamber to produce rattling vibrations.

It should be appreciated that the exterior and interior dimensions can be varied from the specific examples described above. For instance, the body can be configured with a thinner wall thickness to allow for greater sound and a lighter weight jig that may be more easily maneuvered through submerged vegetation. On the other hand, the body can have a thicker wall for a heavier jig that falls more quickly to the bottom of the fishing site. As mentioned above, the exterior configuration may be varied for different performance characteristics. Similarly, the shape of the interior cavity may be modified to alter the sound of the pellets rattling within the cavity.

Returning now to FIG. 5A and FIG. 5B, the male portion 16 further includes a hook groove 186 extending from the planar surface 168 of the lip 166 and the medial surface 162 in a direction toward the lateral portion 158. As shown in FIG. 5A, the hook groove 186 includes a lip portion 190 which extends into the lip 166, a body portion 194 which extends into the medial portion 154 of the male portion 16, and a cavity portion 198 which extends into the blind cavity 94. Together, the lip portion 190, the body portion 194, and the cavity portion 198 form the hook groove 186 as an elongated pathway with a rounded base 200 (shown in FIG. 5A) which extends into the male portion 16 and is open into the medial portion 154 such that the hook 14 (shown in FIG. 2) is insertable into the hook groove 186 from the direction of the planar surface 168 of the lip 166 and the medial surface 162 of the male portion 16 when the jig body 12 is not assembled.

As shown in FIG. 5A, the elongated pathway of the hook groove 186 has a consistent groove diameter 202, a consistent groove width 204, and a consistent groove depth 206 except within the cavity portion 198 of the hook groove 186. Within the cavity portion 198, the hook groove 186 is exposed to the blind cavity 94 of the male portion 16 such that the hook groove 186 is in fluid communication with the blind cavity 94. Besides within the cavity portion 198, the groove diameter 202 is measured at the rounded base 200 of the hook groove 186, the groove depth 206 is measured from the planar surface 168 of the lip 166 in a direction perpendicular to the planar surface 168, and the groove width 204 is measured across the hook groove 186 in a direction perpendicular to the groove depth 206. The groove diameter 202, the groove width 204, and the groove depth 206 are determined by the size of the hook 14 (shown in FIG. 2) that is used in the rattling jig 10. In the present embodiment, the hook groove 186 is formed in the male portion 16 by milling. In other embodiments, however, the hook groove 186 can be formed in another manner so as to form a smooth, continuous groove within the male portion 16.

As shown in FIG. 2, the hook 14 includes an eye 210, a shank 214, a bend 218, a barb 222, and a point 226. The eye 210 of the hook 14 is tied to a fishing line held by the fisherman. The shank 214 of the hook 14 is substantially cylindrical and has a shank diameter 230 which varies depending on the size of the hook 14 being used. The bend 218 of the hook 14 is a portion of the shank 214 which is bent at a particular angle A. The angle A of the bend 218 varies depending on the type of hook 14 being used and/or the type of fish being sought. The barb 222 and the point 226 of the hook 14 are sharp protrusions which are oriented in opposite directions from one another. Thus, when a fish is snagged by the hook 14, the sharp protrusions of the barb 222 and the point 226 together prevent the fish from disengaging from the hook 14.

Returning to FIG. 5A, the groove diameter 202 is larger than the shank diameter 230 of the hook 14 to enable the hook 14 to be received in the rounded base 200 of the hook groove 186. In the present embodiment, the groove diameter 202 is 0.002 inches larger than the shank diameter 230. Similarly, the groove width 204 is larger than the shank diameter 230 to enable the hook 14 to pass through the lip portion 190, body portion 194, and cavity portion 198 and into the rounded base 200 of the hook groove 186. In the present embodiment, the groove width 204 is 0.002 inches larger than the shank diameter 230.

Additionally, the groove depth 206 is larger than the shank diameter 230 of the hook 14 to enable the shank 214 to pass substantially through the lip portion 190 of the hook groove 186 into the rounded base 200 of the hook groove 186 but also to retain a portion of the shank 214 within the lip portion 190. In other words, when viewed from the perspective in FIG. 5A, a portion of the shank 214 remains above the medial surface 162 of the male portion 16. Accordingly, when the male portion 16 is press-fitted within the female portion 18, and the medial surface 134 of the female portion 18 is brought into contact with the medial surface 162 of the male portion 16, the portion of the shank 214 extending above the medial surface 162 of the male portion 16 is pressed between the female portion 18 and the male portion 16 and the hook 14 is thus held firmly in place within the jig body 12. In the present embodiment, the groove depth 206 is equivalent to the lip height 170 plus 75-85% of the shank diameter 230. In other words, approximately 15-25% of the shank 214 extends above the medial surface 162 of the male portion 16.

Turning now to FIG. 5B, the hook groove 186 also includes an eye portion 234, an exposed portion 236, a bend portion 238, and a barb portion 242. The eye portion 234 is configured such that when the rattling jig 10 is assembled as shown in FIG. 1, and the hook 14 is received within the hook groove 186, the eye 210 (shown in FIG. 2) of the hook 14 is oriented nearest to the eye portion 234 of the hook groove 186. Similarly, the barb portion 242 is configured such that when the rattling jig 10 is assembled as shown in FIG. 1, the barb 222 (shown in FIG. 2) of the hook 14 is oriented nearest to the barb portion 242.

The exposed portion 236 of the hook groove 186 is arranged between the eye portion 234 and the barb portion 242 and is configured to coincide with the cavity portion 198 of the hook groove 186. Accordingly, when the rattling jig 10 is assembled as shown in FIG. 1, and the hook 14 is received within the hook groove 186, the shank 214 is exposed to the blind cavity 94 and thus to the single internal cavity. When the plurality of pellets 20 tumble within the jig body 12, the pellets 20 sporadically contact the shank 214 which transmits the resulting vibrations through the hook 14 into the bait and surrounding water. Thus, exposing the shank 214 to the pellets 20 within the jig body 12 enhances the ability of the rattling jig 10 to attract the attention of nearby fish.

Like the exposed portion 236, the bend portion 238 of the hook groove 186 is also arranged between the eye portion 234 and the barb portion 242 and is configured such that when the rattling jig 10 is assembled as shown in FIG. 1, the bend 218 (shown in FIG. 2) of the hook 14 is oriented within the bend portion 238. The bend portion 238 of the hook groove 186 is bent at a particular angle B relative to the barb portion 242, and the angle B of the bend portion 238 is smaller than the angle A of the bend 218 such that when the hook 14 is received within the hook groove 186, the shank 214 is held at tension within the bend portion 238. Holding the shank 214 at tension within the hook groove 186 enables the vibrations transmitted by the plurality of pellets 20 rattling within the jig body 12 to be transmitted more easily and precisely through the hook 14 into the bait and surrounding water. Thus, holding the shank 214 at tension within the jig body 12 enhances the ability of the rattling jig 10 to attract the attention of nearby fish. Additionally, holding the shank 214 at tension within the hook groove 186 enables the vibrations transmitted by contact of a fish with any part of the rattling jig 10 to be transmitted more easily and precisely through the hook 14 via the eye 210 to the fishing line held by the fisherman. Thus, holding the shank 214 at tension within the jig body 12 enhances the ability of the rattling jig 10 to alert the fisherman to the presence of a fish.

Alternative configurations of the male and female components of the jig are also contemplated provided that the components create a cavity sized to permit rattling of one or more pellets therein and provided that the components support the hook in a manner that it can be contacted by the rattling pellets. For instance, in one alternative, the jig may include a female portion in the form of a lead body defining the cavity for the pellets. The male portion may be a plug that is threaded or pressed into the opening the of the cavity that simply closes the end of the cavity rather than adding to the cavity volume as in the embodiment described above. A groove across the opening of the female portion can be provided to support the hook so that the male plug holds the hook in place when the plug closes the cavity opening.

While the rattling jig has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A fishing lure comprising:
   a hook;
   a hollow body defining a cavity therein and including a groove passing through the body configured to receive a portion of the hook therein, the body including a first portion defining the groove and at least a portion of the cavity with a cavity opening, the body further including a second portion coupled to the first portion to close the cavity opening; and
   a number of pellets contained within the cavity, the number of pellets sized to rattle within the cavity, wherein:
   the first portion further includes a protrusion,
   the second portion further includes an indentation configured to receive the protrusion to couple the second portion to the first portion,
   the groove is configured to pass through the protrusion, and
   the hook is retained in the protrusion by the indentation.

2. The fishing lure of claim 1, wherein said groove intersects said cavity opening such that when the second portion is coupled to the first portion, the hook is retained within the groove by the second portion.

3. The fishing lure of claim 1, wherein the second portion is configured to be coupled to the first portion by press-fitting.

4. The fishing lure of claim 1, wherein:
   the hook includes a hook bend formed at a hook angle, and
   the groove includes a groove bend configured to receive the hook bend.

5. The fishing lure of claim 4, wherein:
   the groove bend is formed at a groove angle, and
   the groove angle is less than the hook angle such that the hook is retained in tension within the groove.

6. The fishing lure of claim 1, wherein the groove includes an exposed portion intersecting said cavity.

7. The fishing lure of claim 6, wherein the hollow body is configured such that the number of pellets contact the hook at the exposed portion of the groove.

8. The fishing lure of claim 1, wherein said number of pellets includes at least two pellets.

9. The fishing lure of claim 8, wherein said at least two pellets are generally spherical.

10. The fishing lure of claim 9, wherein said at least two pellets have different diameters.

11. A fishing lure to be coupled to a fishing hook, the fishing lure comprising:
    a number of pellets; and
    a body including:
      a first portion having a first cavity and a protrusion,
      a second portion having a second cavity and an indentation configured to receive the protrusion to couple the second portion to the first portion such that the first cavity and the second cavity form an internal cavity configured to contain the number of pellets, and
      a groove configured to retain the fishing hook, the groove extending through the protrusion, the groove including an exposed portion in communication with the internal cavity,
    wherein the indentation is configured to retain the fishing hook within the protrusion.

12. The fishing lure of claim 11, wherein the first portion and the second portion are configured to be coupled to one another by press-fitting.

13. The fishing lure of claim 11, wherein the groove includes a groove bend configured to retain the fishing hook in tension within the groove.

14. The fishing lure of claim 11, wherein the body is configured such that the number of pellets contact the fishing hook at the exposed portion of the groove.

* * * * *